United States Patent [19]
Neal et al.

[11] Patent Number: 5,502,476
[45] Date of Patent: Mar. 26, 1996

[54] METHOD AND APPARATUS FOR CONTROLLING PHASE-CHANGE INK TEMPERATURE DURING A TRANSFER PRINTING PROCESS

[75] Inventors: Meade M. Neal, Mulino; Clark W. Crawford, Wilsonville; Barry D. Reeves; James D. Rise, both of Lake Oswego, all of Oreg.

[73] Assignee: Tektronix, Inc., Wilsonville, Oreg.

[21] Appl. No.: 223,265

[22] Filed: Apr. 4, 1994

Related U.S. Application Data

[63] Continuation-in-part of Ser. No. 981,646, Nov. 25, 1992, Pat. No. 5,389,958.

[51] Int. Cl.$^6$ .................................................... B41J 2/01
[52] U.S. Cl. .......................................... 347/103; 347/102
[58] Field of Search ........................... 347/103, 88, 102; 355/273

[56] References Cited

U.S. PATENT DOCUMENTS

| | | | |
|---|---|---|---|
| 4,193,680 | 3/1980 | Yoshikawa | 355/273 |
| 4,538,156 | 8/1985 | Durkee et al. | 347/103 |
| 4,673,303 | 6/1987 | Sansone et al. | 347/103 X |
| 4,731,647 | 3/1988 | Kohsahi | 346/140 |
| 4,833,530 | 5/1989 | Kohsahi | 347/103 |
| 5,099,256 | 3/1992 | Anderson | 347/103 |
| 5,372,852 | 12/1994 | Titterington | 347/103 X |
| 5,389,958 | 2/1995 | Bui | 347/103 |

FOREIGN PATENT DOCUMENTS

| | | | |
|---|---|---|---|
| 0583168 | 2/1994 | European Pat. Off. | B41M 5/38 |
| 9401283 | 1/1994 | WIPO | B41J 2/01 |

*Primary Examiner*—Joseph W. Hartary
*Attorney, Agent, or Firm*—Ralph D'Alessandro; Richard B. Preiss

[57] ABSTRACT

A phase-change ink transfer printing process and apparatus (10) applies a thin layer of a liquid forming an intermediate transfer surface (12) to a heated receiving surface, such as a drum (14). Then an ink-jet printhead (11) deposits a molten ink image (26) onto the heated drum where it cools to the drum temperature and solidifies. After the image is deposited, a print medium (21) is heated by a preheater (27) to a predetermined temperature and fed into a nip (22) formed between the heated drum and an elastomeric transfer roller (23) that is biased toward the drum to form a nip pressure that is about twice the yield strength of the ink image. As the drum turns, the heated print medium is pulled through the nip to transfer and fuse the ink image to the print medium. When in the nip, heat from the drum and print medium combine to heat the ink in accordance with a process window (90), making the ink sufficiently soft and tacky to adhere to the print medium but not to the drum. When the print medium leaves the nip, stripper fingers (24) peel it from the drum and direct it into a media exit path.

18 Claims, 9 Drawing Sheets

METHOD AND APPARATUS FOR CONTROLLING PHASE-CHANGE INK TEMPERATURE DURING A TRANSFER PRINTING PROCESS

This is a continuation-in-part of application Ser. No. 07/981,646 filed Nov. 25, 1992 now U.S. Pat. No. 5,389,958 entitled "Imaging Process" and assigned to the assignee of the present invention

TECHNICAL FIELD

This invention relates generally to a printing process and more particularly to an ink-jet printing system and process employing mechanisms for controlling the temperature of phase-change ink during a transfer printing process.

BACKGROUND OF THE INVENTION

Ink-jet printing systems have been employed utilizing intermediate transfer surfaces, such as that described in U.S. Pat. No. 4,538,156 of Durkee et al. in which an intermediate transfer drum is employed with a printhead. A final receiving surface of paper is brought into contact with the intermediate transfer drum after the image has been placed thereon by the nozzles in the printhead. The image is then transferred to the final receiving surface.

U.S. Pat. No. 5,099,256 of Anderson describes an intermediate drum with a surface that receives ink droplets from a printhead. The intermediate drum surface is thermally conductive and formed from a suitable film-forming silicone polymer allegedly having a high surface energy and high degree of surface roughness to prevent movement of the ink droplets after receipt from the printhead nozzles. Other imaging patents, such as U.S. Pat. Nos. 4,731,647 and 4,833,530 of Kohsahi, describe a solvent that is deposited on colorant to dissolve the colorant and form a transferable drop to a recording medium. The colorants are deposited directly onto paper or plastic colorant transfer sheets. The transferable drops are then contact transferred to the final receiving surface medium, such as paper.

U.S. Pat. No. 4,673,303 of Sansone et al. describes an offset ink-jet postage printing method and apparatus in which an inking roll applies ink to the first region of a dye plate. A lubricating hydrophilic oil can be applied to the exterior surface of the printing drum or roll to facilitate the accurate transfer of the images from the drum or roll to the receiving surface.

The above-described processes do not achieve a complete image transfer from the intermediate transfer surface under normal printing conditions and, therefore, require a separate cleaning step to remove any residual ink from the intermediate receiving surface. Prior intermediate transfer surfaces also have not been renewable.

The prior processes are also limited in the degree of image quality that can be achieved on different types of final receiving surfaces or print media. Because the inks are fluids, they are subject to uncontrolled bleeding on porous media, such as paper, and uncontrolled spreading on transparency films or glossy coated papers.

The above-described problems are addressed by processes and apparatus described in co-pending U.S. patent application Ser. Nos. 07/981,646 and 07/981,677, both filed Nov. 25, 1992 and assigned to the assignee of this application. A transfer printer employing phase-change ink is described in which a liquid intermediate transfer surface is provided that receives a phase-change ink image on a drum. The image is then transferred from the drum with at least a portion of the intermediate transfer surface to a final receiving medium, such as paper.

In particular, the phase-change ink transfer printing process begins by first applying a thin liquid intermediate transfer surface to the drum. Then an ink-jet printhead deposits molten ink onto the drum where it solidifies and cools to about the temperature of the drum. After depositing the image, the print medium is heated by feeding it through a preheater and into a nip formed between the drum and an elastomeric transfer roller. As the drum turns, the heated print medium is pulled through the nip and is pressed against the deposited image, thereby transferring the ink to the print medium. When in the nip, heat from the print medium heats the ink, making it sufficiently soft and tacky to adhere to the print medium. When the print medium leaves the nip, stripper fingers peel it from the drum and direct it into a media exit path.

In practice, it has been determined that a transfer printing process should meet at least the following criteria to produce acceptable prints. To optimize image resolution, the transferred ink drops should spread out to cover a predetermined area, but not so much that image resolution is lost. The ink drops should not melt during the transfer process. To optimize printed image durability, the ink drops should be pressed into the paper with sufficient pressure to prevent their inadvertent removal by abrasion. Finally, image transfer conditions should be such that substantially all of the ink drops are transferred from the drum to the paper.

Unfortunately, the proper set of image transfer conditions are dependent on a complexly interrelated set of pressure, temperature, time, and ink parameters that have not been well understood, thereby preventing phase-change transfer printing from meeting its full potential for rapidly producing high-quality prints.

What is needed, therefore, is a phase-change transfer printing process and apparatus that addresses the problems and challenges of controlling the image transfer conditions to rapidly produce consistently high-quality prints on a wide range of print media.

SUMMARY OF THE INVENTION

An object of this invention is, therefore, to provide an improved apparatus and a method for transfer printing.

Another object of this invention is to provide a transfer printing apparatus and a method having controlled transfer conditions that provide durable high-resolution printed images.

A further object of this invention is to provide a transfer printing apparatus and a method that rapidly produces color printed images on a wide range of print media types.

Accordingly, this invention provides a phase-change ink transfer printing apparatus and process that starts by applying a thin layer of a liquid intermediate transfer surface to a heated receiving surface, such as a drum. Then an ink-jet printhead deposits a molten ink image onto the heated drum where it cools to the drum temperature and solidifies. After the image is deposited, a print medium is heated by a preheater to a predetermined temperature and fed into a nip formed between the heated drum and an elastomeric transfer roller that is biased toward the drum to form a nip pressure that is about twice the yield strength of the ink in the deposited image. As the drum turns, the heated print medium is pulled through the nip at a predetermined rate to transfer and fuse the ink image to the print medium. When in the nip, heat from the drum and print medium combine to heat the ink in accordance with a process window, making the ink sufficiently soft and tacky to adhere to the print medium but not to the drum. When the print medium leaves the nip, stripper fingers peel it from the drum and direct it into a media exit path.

Additional objects and advantages of this invention will be apparent from the following detailed description of a preferred embodiment thereof that proceeds with reference to the accompanying drawings.

DETAILED DESCRIPTION OF PREFERRED EMBODIMENT

Figure 1:
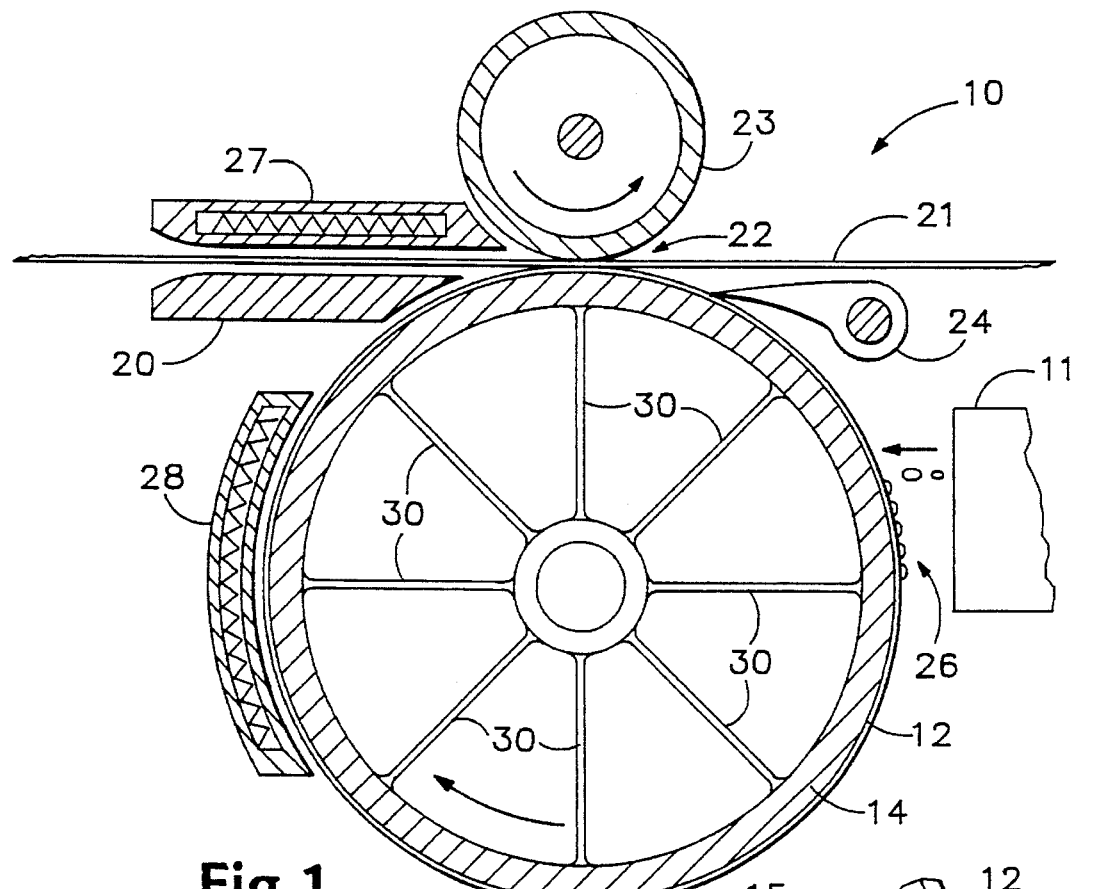
FIG. 1 is a pictorial schematic diagram showing a transfer printing apparatus having a supporting surface adjacent to a liquid layer applicator and a printhead that deposits the image on the liquid layer.

FIG. 1 shows an imaging apparatus 10 utilized in this process to transfer an inked image from an intermediate transfer surface to a final receiving substrate. A printhead 11 is supported by an appropriate housing and support elements (not shown) for either stationary or moving utilization to place an ink in the liquid or molten state on a supporting intermediate transfer surface 12 that is applied to a supporting surface 14. Intermediate transfer surface 12 is a liquid layer that is applied to supporting surface 14, such as a belt, drum, web, platen, or other suitable design, by contact with an applicator, such as a metering blade, roller, web, or a wicking pad 15 contained within an applicator assembly 16.

Supporting surface 14 (hereafter "drum 14") may be formed from or surface coated with any appropriate material, such as metals including but not limited to aluminum, nickel, or iron phosphate, elastomers including but not limited to fluoroelastomers, perfluoroelastomers, silicone rubber, and polybutadiene, plastics including but not limited to polyphenylene sulfide loaded with polytetrafluorethylene, thermoplastics such as polyethylene, nylon, and FEP, thermosets such as acetals, and ceramics. The preferred material is anodized aluminum.

Applicator assembly 16 optionally contains a reservoir 18 for the liquid and most preferably contains a web and web advancing mechanism (both not shown) to periodically present fresh web for contact with drum 14.

Wicking pad 15 and the web are synthetic textiles. Preferably the wicking pad 15 is needled felt and the web is any appropriate nonwoven synthetic textile with a relatively smooth surface. An alternative configuration employs a smooth wicking pad 15 mounted atop a porous supporting material, such as a polyester felt. Both materials are available from BMP Corporation as BMP products NR 90 and PE 1100-UL, respectively.

Applicator apparatus 16 is mounted for retractable movement upward into contact with the surface of drum 14 and downwardly out of contact with the surface of the drum 14 and its intermediate transfer surface 12 by means of an appropriate mechanism, such as a cam, an air cylinder or an electrically actuated solenoid.

A final substrate guide 20, which can also be the lower surface of the preheater, passes a final receiving substrate 21, such as paper, from a positive feed device (not shown) and guides it through a nip 22 formed between the opposing arcuate surfaces of a roller 23 and intermediate transfer surface 12 supported by drum 14. Stripper fingers 24 (only one of which is shown) may be pivotally mounted to imaging apparatus 10 to assist in removing final receiving substrate 21 from intermediate transfer surface 12. Roller 23 has a metallic core, preferably steel, with an elastomeric covering having a Shore D hardness and/or durameter of 40 to 45. Suitable elastomeric covering materials include silicones, urethanes, nitriles, EPDM, and other appropriately resilient materials. The elastomeric covering on roller 23 engages final receiving substrate 21 on a reverse side to which an ink image 26 is transferred from intermediate transfer surface 12. This fuses or fixes ink image 26 to final receiving surface 21 so that the transferred ink image is spread, flattened, and adhered.

The ink utilized in the process and system of this invention is preferably initially in solid form and is then changed to a molten state by the application of heat energy to raise its temperature to about 85° C. to about 150° C. Elevated temperatures above this range will cause degradation or chemical breakdown of the ink. The molten ink is then ejected from the ink jets in printhead 11 to the intermediate transfer surface 12, where it is cooled to an intermediate temperature and solidifies to a malleable state in which it is transferred to final receiving surface 21 via a contact transfer by entering nip 22 between roller 23 and intermediate transfer surface 12 on drum 14. The intermediate temperature wherein the ink is maintained in the malleable state is between about 20° C. to about 60° C. and preferably about 50° C.

Once ink image 26 enters nip 22, it is deformed to its final image conformation and adheres or is fixed to final receiving substrate 21 by a combination of nip 22 pressure exerted by roller 23 and heat supplied by a media preheater 27 and a drum heater 28. Drum heater 28 is preferably a lamp and reflector assembly oriented to radiantly heat the surface of drum 14. Alternatively, a cylindrical heater may be axially mounted within drum 14 such that heat generated therein is radiated directly and conducted to drum 14 by radial fins 30.

The pressure exerted in nip 22 by roller 23 on ink image 26 is between about 10 to about 1,000 pounds/inch$^2$ ("psi"), more preferably about 500 psi, which is approximately twice the ink yield strength of 250 psi at 50° C. The nip pressure must be sufficient to have ink image 26 adhere to final receiving substrate 21 and be sufficiently flattened to transmit light rectilinearly through the ink image in those instances when final receiving substrate 21 is a transparency. Once adhered to final receiving substrate 21, the ink image is cooled to an ambient temperature of about 20° C. to about 25° C.

Figure 2:
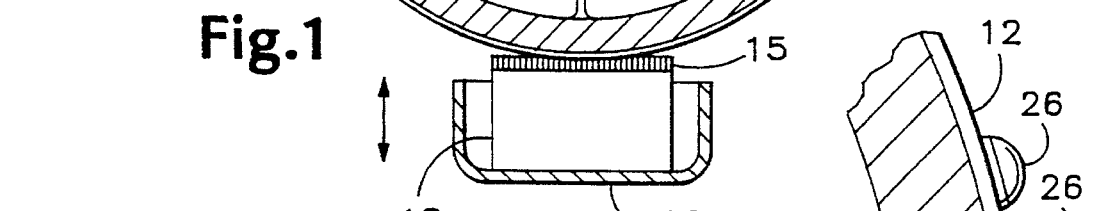
FIG. 2 is an enlarged pictorial schematic diagram showing the liquid layer acting as an intermediate transfer surface supporting the ink.
Figure 3:
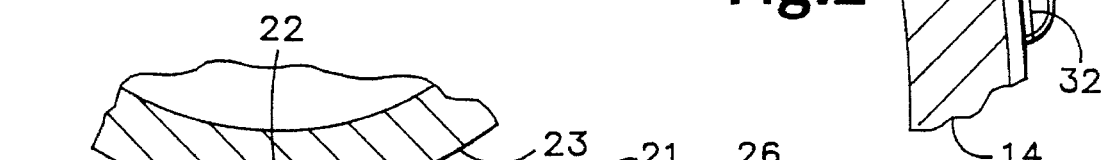
FIG. 3 is an enlarged pictorial schematic diagram showing the transfer of the ink image from the liquid intermediate transfer surface to a final receiving surface.

FIGS. 2 and 3 show the sequence involved when ink image 26 is transferred from intermediate transfer surface 12 to final receiving substrate 21. Ink image 26 transfers to final receiving substrate 21 with a small but measurable quantity of the liquid forming intermediate transfer surface 12 attached thereto as a transferred liquid layer 32. A typical thickness of transferred liquid layer 32 is calculated to be about 1000 angstroms or about 100 nanometers. Alternatively, the quantity of transferred liquid layer 32 can be expressed in terms of mass as being from about 0.1 to about 200 milligrams, more preferably from about 0.5 to about 50 milligrams, and most preferably from about 1 to about 10 milligrams per A-4 sized page of final receiving substrate 21. This is determined by tracking on a test fixture the weight loss of the liquid in the applicator assembly 16 at the start of the imaging process and after a desired number of sheets of final receiving substrate 21 have been imaged.

Some appropriately small and finite quantity of intermediate transfer surface 12 is also transferred to the final receiving substrate in areas adjacent to transferred ink image 26. This relatively small transfer of intermediate transfer surface 12 to ink image 26 and the non-imaged areas on the final receiving substrate 21 can permit as many as 10 pages or more of final receiving substrate 21 to be printed before it is necessary to replenish sacrificial intermediate transfer surface 12. Replenishment may be necessary after fewer final printed copies, depending on the quality and nature of final receiving surface 21 that is utilized. Transparencies and paper are the primary intended media for image receipt. "Plain paper" is the preferred medium, such as that supplied by Xerox Corporation and many other companies for use in photocopy machines and laser printers. Many other commonly available office papers are included in this category of plain papers, including typewriter grade paper, standard bond papers, and letterhead paper. Xerox® 4024 paper is assumed to be a representative grade of plain paper for the purposes of this invention.

Suitable liquids that may be employed for intermediate transfer surface 12 include water, fluorinated oils, glycol, surfactants, mineral oil, silicone oil, functional oils, or combinations thereof. Functional oils can include but are not limited to mercapto-silicone oils, fluorinated silicone oils, and the like.

The ink used to form ink image 26 preferably must have suitable specific properties for viscosity. Initially, the viscosity of the molten ink must be matched to the requirements of the ink-jet device utilized to apply it to intermediate transfer surface 12 and optimized relative to other physical and rheological properties of the ink as a solid, such as yield strength, hardness, elastic modulus, loss modulus, ratio of the loss modulus to the elastic modulus, and ductility. The viscosity of the phase-change ink carrier composition has been measured on a Ferranti-Shirley Cone Plate Viscometer with a large cone. At about 140° C. a preferred viscosity of the phase-change ink carrier composition is from about 5 to about 30 centipoise, more preferably from about 10 to about 20 centipoise, and most preferably from about 11 to about 15 centipoise. The surface tension of suitable inks is between about 23 and about 50 dynes/cm. An appropriate ink composition is described in U.S. Pat. No. 4,889,560 issued Dec. 26, 1989, which is assigned to the assignee of this invention and specifically incorporated herein by reference.

The phase-change ink used in this invention is formed from a phase-change ink carrier composition that exhibits excellent physical properties. For example, the subject phase-change ink, unlike prior art phase-change inks, exhibits a high level of lightness, chroma, and transparency when utilized in a thin film of substantially uniform thickness. This is especially valuable when color images are conveyed using overhead projection techniques. Furthermore, the preferred phase-change ink compositions exhibit the preferred mechanical and fluidic properties mentioned above when measured by dynamic mechanical analyses ("DMA"), compressive yield testing, and viscometry. More importantly, these work well when used in the printing process of this invention utilizing a liquid layer as the intermediate transfer surface. The phase-change ink composition and its physical properties are discussed in greater detail in co-pending U.S. patent application Ser. No. 07/981,677, filed Nov. 25, 1992, which is assigned to the assignee of this invention and specifically incorporated herein by reference.

The above-defined DMA properties of the phase-change ink compositions were experimentally determined. These dynamic measurements were done on a Rheometrics Solids Analyzer (RSA II) manufactured by Rheometrics, Inc. of Piscataway, N.J., using a dual cantilever beam geometry. The dimensions of the sample were about 2.0±1.0 mm thick, about 6.5±0.5 mm wide, and about 54.0±1.0 mm long. A time/cure sweep was carried out under a desired force oscillation or testing frequency of about 1 KHz and an auto-strain range of about $1.0 \times 10^{-5}$ percent to about 1 percent. The temperature range examined was about −60° C. to about 90° C. The preferred phase-change ink compositions typically are (a) flexible at a temperature of about −10° C. to about 80° C., (b) have a temperature range for the glassy region from about −100° C. to 40° C, the value of E' being from about $1.5 \times 10^9$ to $1.5 \times 10^{11}$ dyne/cm$^2$, (c) have a temperature range for the transition region from about −30° C. to about 60° C., (d) have a temperature range for the rubbery region of E' from about −10° C. to 100° C., the value of E' being from about $1.0 \times 10^6$ to $1.0 \times 10^{11}$ dyne/cm$^2$, and (e) have a temperature range for the terminal region of E' from about 30° C. to about 160° C. Furthermore, the glass transition temperature range of the phase-change ink compositions are from about −40° C. to about 40° C., the temperature range for integrating under the tan δ peak of the phase-change ink composition is from about −80° C. to about 80° C. with integration values ranging from about 5 to about 40, and the temperature range for the peak value of tan δ of the phase-change ink is from about −40° C. to about 40° C. with a tan δ of about $1.0 \times 10^{-2}$ to about $1.0 \times 10$ at peak.

Figure 4:
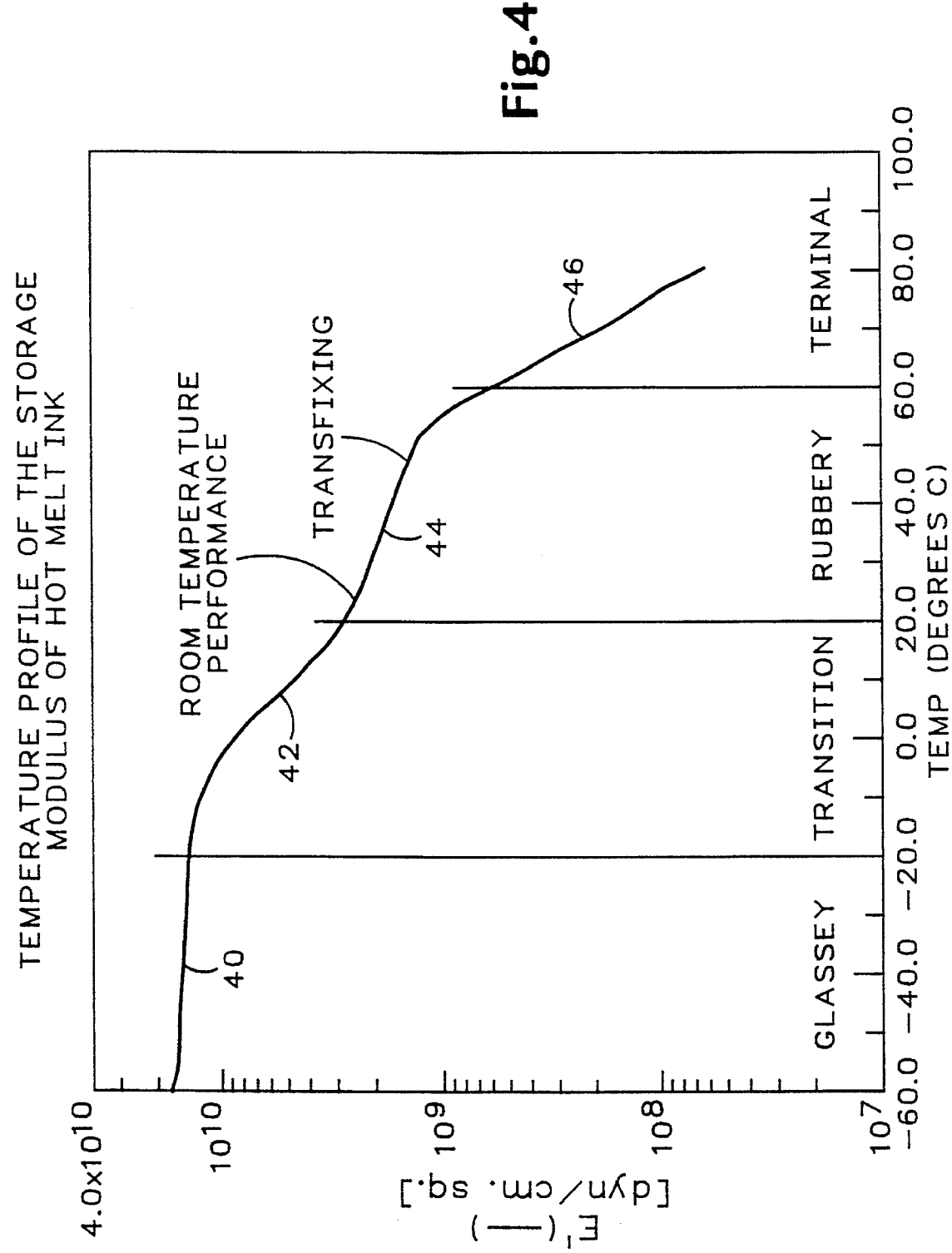
FIG. 4 is a graph showing storage modulus as a function of temperature for a phase-change ink suitable for use with this invention.

FIG. 4 shows a representative graph of a storage modulus E' as a function of temperature at 1 Hz for a phase-change ink composition suitable for use in the printing process of this invention. The graph indicates that storage modulus E' is divided into a glassy region 40, a transition region 42, a rubbery region 44, and a terminal region 46.

In glassy region 40 the ink behaves similar to a hard, brittle solid, i.e., E' is high, about $1 \times 10^{10}$ dyne/cm$^2$. This is because in this region there is not enough thermal energy or sufficient time for the molecules to move. This region needs to be well below room temperature so the ink will not be brittle and affect its room temperature performance on paper.

In transition region 42 the ink is characterized by a large drop in the storage modulus of about one order of magnitude because the molecules have enough thermal energy or time to undergo conformational changes. In this region, the ink changes from being hard and brittle to being tough and leathery.

In rubbery region 44 the storage modulus change is shown as a slightly decreasing plateau. In this region, there is a short-term elastic response to the deformation that gives the ink its flexibility. It is theorized that the impedance to motion or flow in this region is due to entanglements of molecules or physical cross-links from crystalline domains. Producing the ink to obtain this plateau in the appropriate temperature range for good transfer and fixing and room temperature performance is important when formulating these phase-change ink compositions. Rubbery region 44 encompasses the ink in both its malleable state during the transfer and fixing or fusing step and its final ductile state on the final receiving substrate.

Finally, in terminal region 46, there is another drop in the storage modulus. It is believed that in this region the molecules have sufficient energy or time to flow and overcome their entanglements.

Several phase-change ink compositions were analyzed by compressive yield testing to determine their compressive behavior while undergoing temperature and pressure in nip 22. The compressive yield strength measurements were done on an MTS SINTECH 2/D mechanical tester manufactured by MTS Sintech, Inc. of Cary, N.C., using small cylindrical sample blocks. The dimensions of a typical sample are about 19.0±1.0 mm by about 19.0±1.0 mm.

Isothermal yield stress was measured as a function of temperature (about 25° C. to about 80° C.) and strain rate. The material was deformed up to about 40 percent.

The preferred yield stresses as a function of temperature for suitable phase-change ink compositions for use in the indirect printing process of this invention are described by an equation YS=mT+I, where YS is the yield stress as a function of temperature, m is the slope, T is the temperature, and I is the intercept.

Under nonprocess conditions, i.e., after the final printed product is formed or conditions under which the ink sticks are stored, and the ink is in a ductile state or condition at a temperature range of from at least about 10° C. to about 60° C., the preferred yield stress values are described by m as being from about −9±2 psi/° C. to about −36±2 psi/° C. and I as being from about 800±100 psi to about 2,200±100 psi. More preferably, m is about −30±2 psi/° C., and I is about 1,700±100 psi.

Under process conditions, i.e., during the indirect printing of the ink from an intermediate transfer surface onto a substrate while the ink is in a malleable solid condition or state, at a temperature of from at least about 20° C. to about 80° C., the preferred stress values are described by m as being from about −6±2 psi/ ° C. to about −36±2 psi/° ° C. and I as being from about 800±100 psi to about 1,600±100 psi. More preferably, m is about −9±2 psi/° C., and I is about 950±100 psi.

Figure 5:
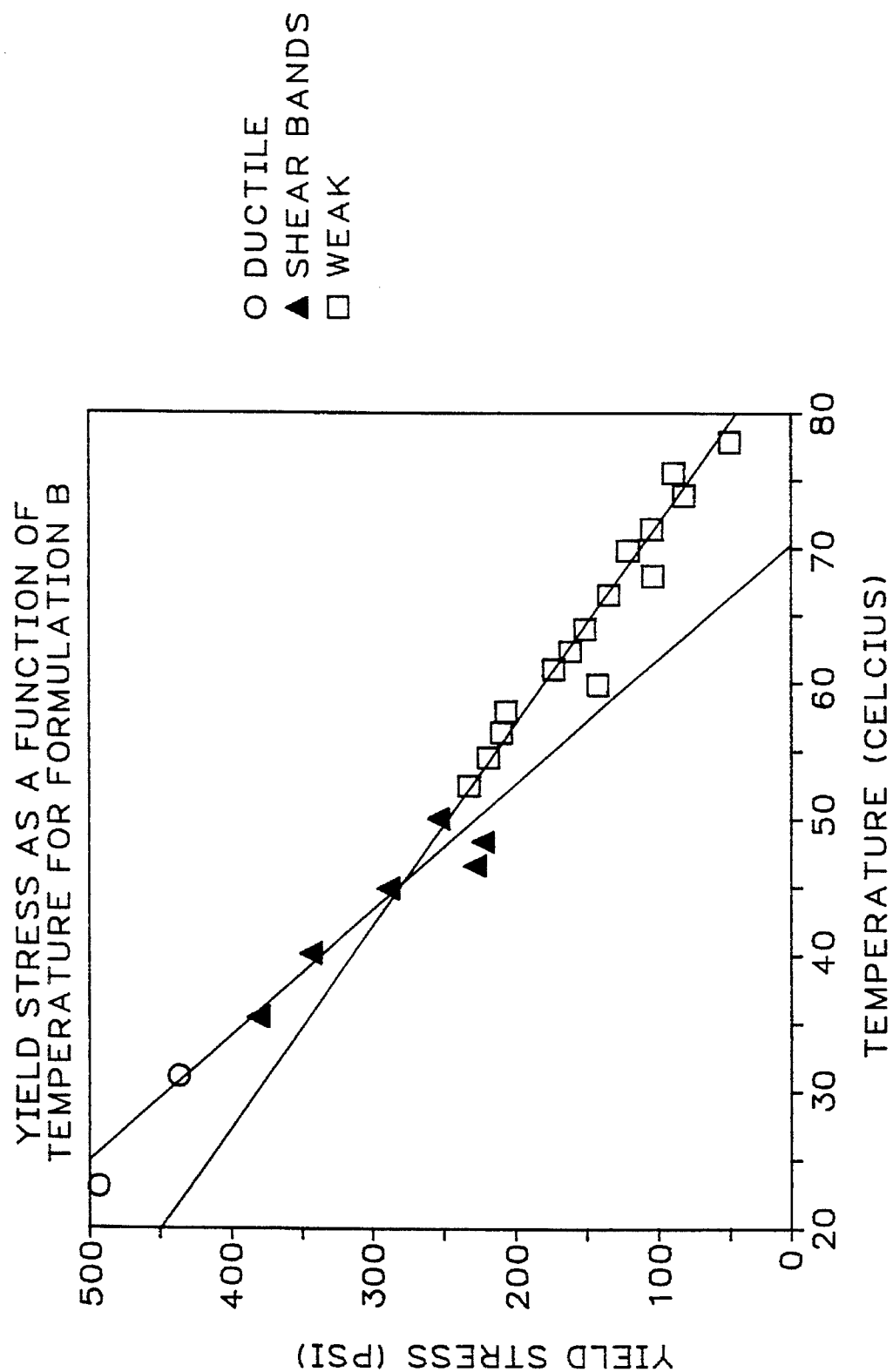
FIG. 5 is a graph showing yield stress as a function of temperature for a phase-change ink suitable for use with this invention.

FIG. 5 shows the yield stress of a suitable phase-change ink as a function of temperature. When subjected to a temperature range of from about 35° C. to about 55° C., the ink will begin to yield (compress) when subjected to a corresponding pressure in a range of from about 200 psi to about 400 psi. Optimal nip pressure is about two times the yield stress pressure of the ink at any particular nip temperature. For example, for a 50° C. yield stress of 250 psi, the nip pressure should be about 500 psi. However, as described with reference to FIGS. 6–10, print quality depends more on various temperature-related parameters than on nip pressure.

Referring again to FIG. 1, during printing, drum 14 has a layer of liquid intermediate transfer surface applied to its surface by the action of applicator assembly 16. Assembly 16 is raised by an appropriate mechanism (not shown), such as a cam or an air cylinder, until wicking pad 15 is in contact with the surface of drum 14. The liquid is retained within reservoir 18 and passes through the porous supporting material until it saturates wicking pad 15 to permit a uniform layer of desired thickness of the liquid to be deposited on the surface of drum 14. Drum 14 rotates about a journalled shaft in the direction shown in FIG. 1 while drum heater 28 heats the liquid layer and the surface of drum 14 to the desired temperature. Once the entire periphery of drum 14 has been coated, applicator assembly 16 is lowered to a noncontacting position with intermediate transfer surface 12 on drum 14. Alternatively, the drum 14 can be coated with the liquid intermediate transfer surface 12 by a web through which the liquid is transmitted by contact with a wick. The wick is wetted from a reservoir containing the liquid.

Ink image 26 is applied to intermediate transfer surface 12 by printhead 11. The ink is applied in molten form, having been melted from its solid state form by appropriate heating means (not shown). Ink image 26 solidifies on intermediate transfer surface 12 by cooling to a malleable solid intermediate state as the drum 14 continues to rotate, entering nip 22 formed between roller 23 and the curved surface of intermediate transfer surface 12 supported by drum 14. In nip 22, ink image 26 is deformed to its final image conformation and adhered to final receiving surface 21 by being pressed there against. Ink image 26 is thus transferred and fixed to the final receiving surface 21 by the nip pressure exerted on it by the resilient or elastomeric surface of the roller 23. Stripper fingers 24 help to remove the imaged final receiving surface 21 from intermediate transfer surface 12 as drum 14 rotates. Ink image 26 then cools to ambient temperature where it possesses sufficient strength and ductility to ensure its durability.

Applicator assembly 16 is actuatable to raise upward into contact with drum 14 to replenish the liquid forming sacrificial intermediate transfer surface 12. Applicator assembly 16 can also function as a cleaner if required to remove lint, paper dust or, for example, ink, should abnormal printing operation occur.

A proper set of image transfer conditions is dependent on a complexly interrelated set of parameters related to nip pressure, preheater and drum temperature, media time in nip 22, and ink parameters. Any particular set of transfer conditions that provide acceptable prints is referred to as a process window.

The process window is determined experimentally by running test prints under sets of controlled transfer conditions. The test prints were made using some fixed control parameters. For instance, a diamond-turned unsealed anodized aluminum drum was used, which is the preferred drum 14. Roller 23 was a typewriter platen having an elastomeric surface with a Shore D hardness and/or durameter of 40 to 45. Each end of roller 23 was biased toward drum 14 with a 350-pound force resulting in an average nip pressure of about 463 psi. Final receiving substrate 21 was Hammermill Laser Print paper. Xerox type 4024 paper may also be used but is not preferred for test prints. The liquid forming intermediate transfer surface 12 was 1000 cSt silicone oil. Final receiving medium 21 was moved through nip 22 at a velocity of about 13 cm/second. The importance of velocity, which is determined by drum 14 rotation speed, is not fully understood. However, the ink temperature in nip 22 substantially reaches equilibrium in about 2 to about 6 milliseconds.

The process for forming intermediate transfer surface 12 on drum 14 entails manually holding an oil pad against rapidly rotating drum 14 until lines of oil can be seen on drum 14. The oil is then wiped or buffed off drum 14 by applying a Kaydry wiping cloth for two seconds against drum 14 and then for five seconds across the drum. This method of applying intermediate transfer surface 12 is closely duplicated by applicator assembly 16.

Sets of test prints were made for various combinations of the temperature of media preheater 27 and the temperature of drum 14.

Four primary factors determine the process window: fuse grade, pixel picking, dot spread, and high temperature limit. Test prints were made as described below to determine temperature ranges for each factor.

Fuse grade is a number proportional to the amount of ink that is physically pressed into paper fibers during the transfer printing process. Fuse grade is quantified by first imaging drum 14 with 4×4 cm squares of blue colored image. The blue colored squares are formed by depositing superimposed layers of cyan and magenta ink onto intermediate transfer surface 12 of drum 14. The blue colored squares are then transferred to the paper final receiving medium 21 as it passes through nip 22. A knife edge is used to scrape the ink from a blue colored square transferred to each test print. An ACS Spectro-Sensor II spectrophotometer measures the optical density (reflectance) of the scraped area and compares it to a blank (white) area of the test print. The reflectance value is the fuse grade, which is proportional to the amount of ink remaining (fused) in the test print. The higher the fuse grade, the higher the optical density of the tested area is. An acceptable minimum fuse grade is 20.

Figure 6:
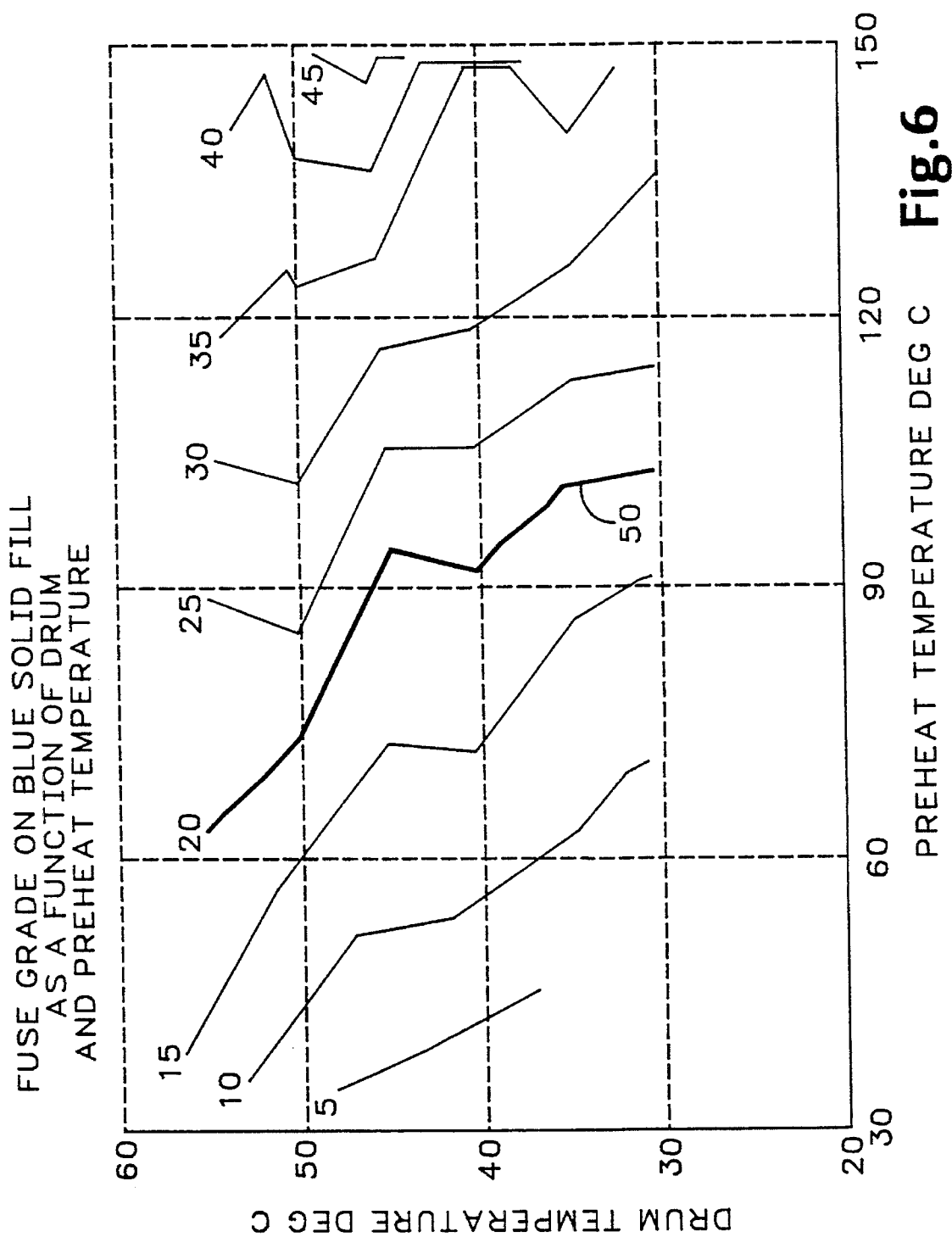
FIG. 6 is a graph showing fuse grade as a function of media preheater and drum temperature as determined from a set of fuse grade test prints made to determine a process window according to this invention.

Fuse grade test print data are shown in FIG. 6, which plots iso-fuse grade lines as a function of drum temperature and media preheater temperature. The relatively vertical orientation of the iso-fuse grade lines indicates that fuse grade is more dependent on the temperature of media preheater 27 than on the temperature of drum 14. An iso-fuse grade line 50 (shown in bold) delimits a left margin of a temperature region in which the fuse grade equals or exceeds the minimum acceptable value of 20.

Pixel picking is a factor that relates to the percentage of ink droplets that are transferred from drum 14 to final receiving media 21 during the transfer printing process. A pixel picking percentage is determined by first imaging drum 14 with a blue color filled field, formed by overprinting cyan and magenta inks on the drum 14 and having 475 unprinted squares each measuring a 3×3 pixel square area. A single black ink drop or pixel is deposited in the center of each unprinted 3×3 pixel square area. The resulting image is then transferred to final receiving medium 21 as it passes through nip 22. All of the double-layered blue colored filled field area transfers, but the single layered 475 black drops within the field are recessed below the blue filled field and are particularly difficult to transfer. The percentage of black drops that transfer is the pixel picking percentage with 80 percent being an acceptable level. Black ink drops not transferred when the test print passes through nip 22 are easily transferred to a second "chaser sheet" of final receiving medium 21 where they are counted to determine the pixel picking percentage.

Figure 7:
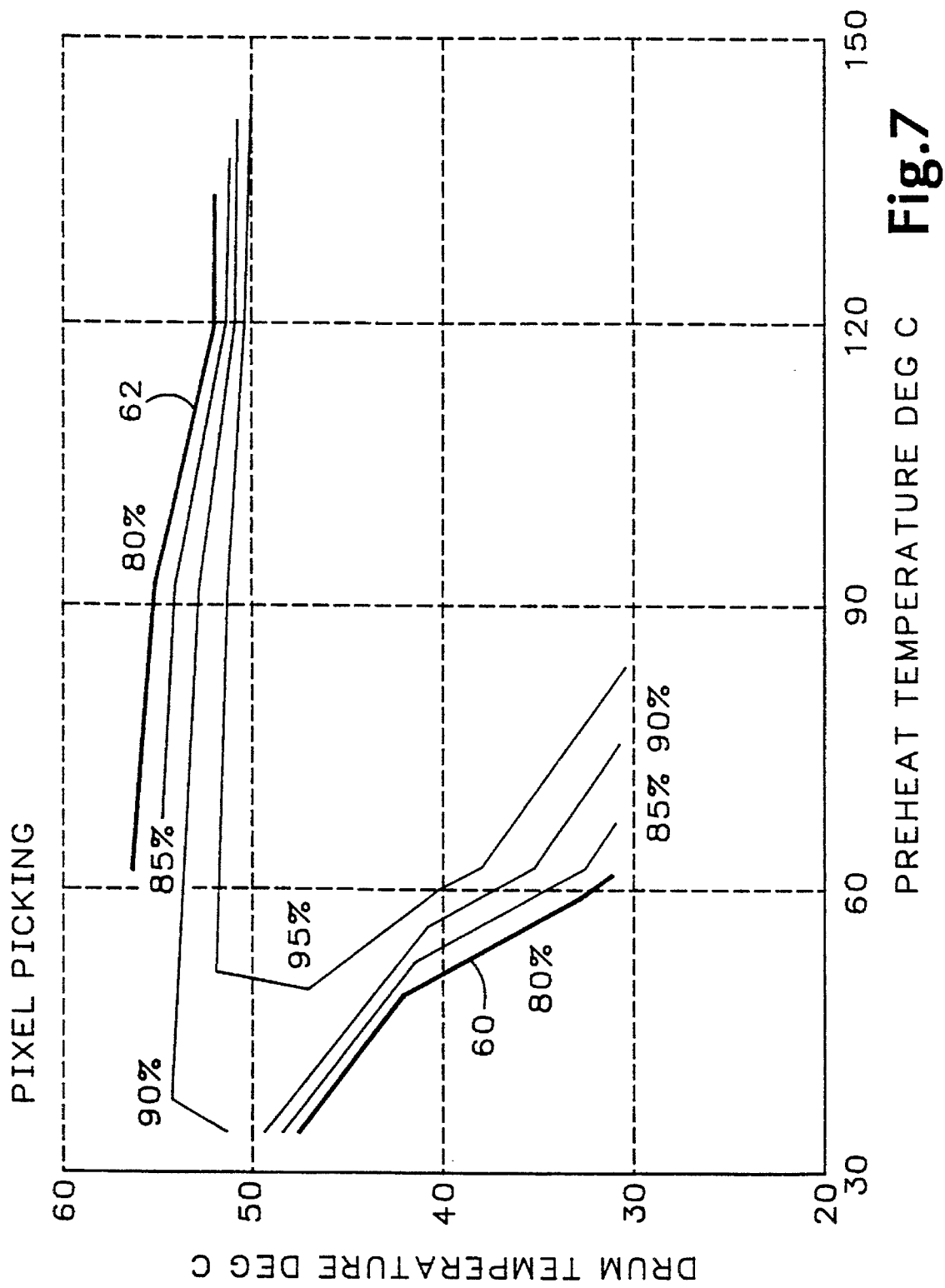
FIG. 7 is a graph showing pixel picking percentage as a function of media preheater and drum temperature as determined from a set of pixel picking test prints made to determine a process window according to this invention.

Pixel picking test print and chaser sheet data are shown in FIG. 7, which plots iso-pixel picking percentage lines as a function of drum temperature and media preheater temperature. Iso-pixel picking percentage lines 60 and 62 (shown in bold) delimit respective left and top margins of a temperature region in which the pixel picking percentage equals or exceeds 80 percent. The graph shows that below about 50° C. pixel picking depends mostly on media preheater 27 temperature, whereas above about 50° C. pixel picking depends mostly on the temperature of drum 14.

Dot spread is classified into six groups related to the degree to which adjacent ink drops (pixels) flatten and blend together to cover final receiving medium 21 during the transfer printing process. Dot spread groups are quantified by first imaging drum 14 with 4×4 cm squares of magenta ink. The magenta squares are formed by depositing a single layer of magenta ink onto intermediate transfer surface 12 of drum 14. Each square consists of ink drops deposited on drum 14 at a uniform spacing defined by the 118 pixel/cm addressability of the test printer. The deposited ink drops have a smaller diameter than the pixel-to-pixel spacing before they are compressed in nip 22. The magenta squares are then transferred to final receiving medium 21 as it passes through nip 22. The process is repeated under various combinations of media preheater 27 and drum 14 temperatures to yield a set of test prints that are inspected under a microscope and sorted into three subjective groups including poor spread, medium spread, and good spread. Poor spread (groups 1 and 2) is defined as the ability to see individual pixels and/or the white lines between adjacent rows of pixels. Medium spread (groups 3 and 4) is defined as the ability to see parts of white lines between adjacent rows of pixels. Good spread (groups 5 and 6) is defined as viewing a solid sheet of ink with no white paper showing through the transferred image. Each of the three print groups was then subdivided into the better and worse prints of each group. Although solid fill areas appear to have a higher print quality with the higher dot spread group numbers, text becomes blurry because of reduced printing resolution. Dot spread groups 4 and 5 strike an acceptable balance between good solid fill and text quality.

Figure 8:
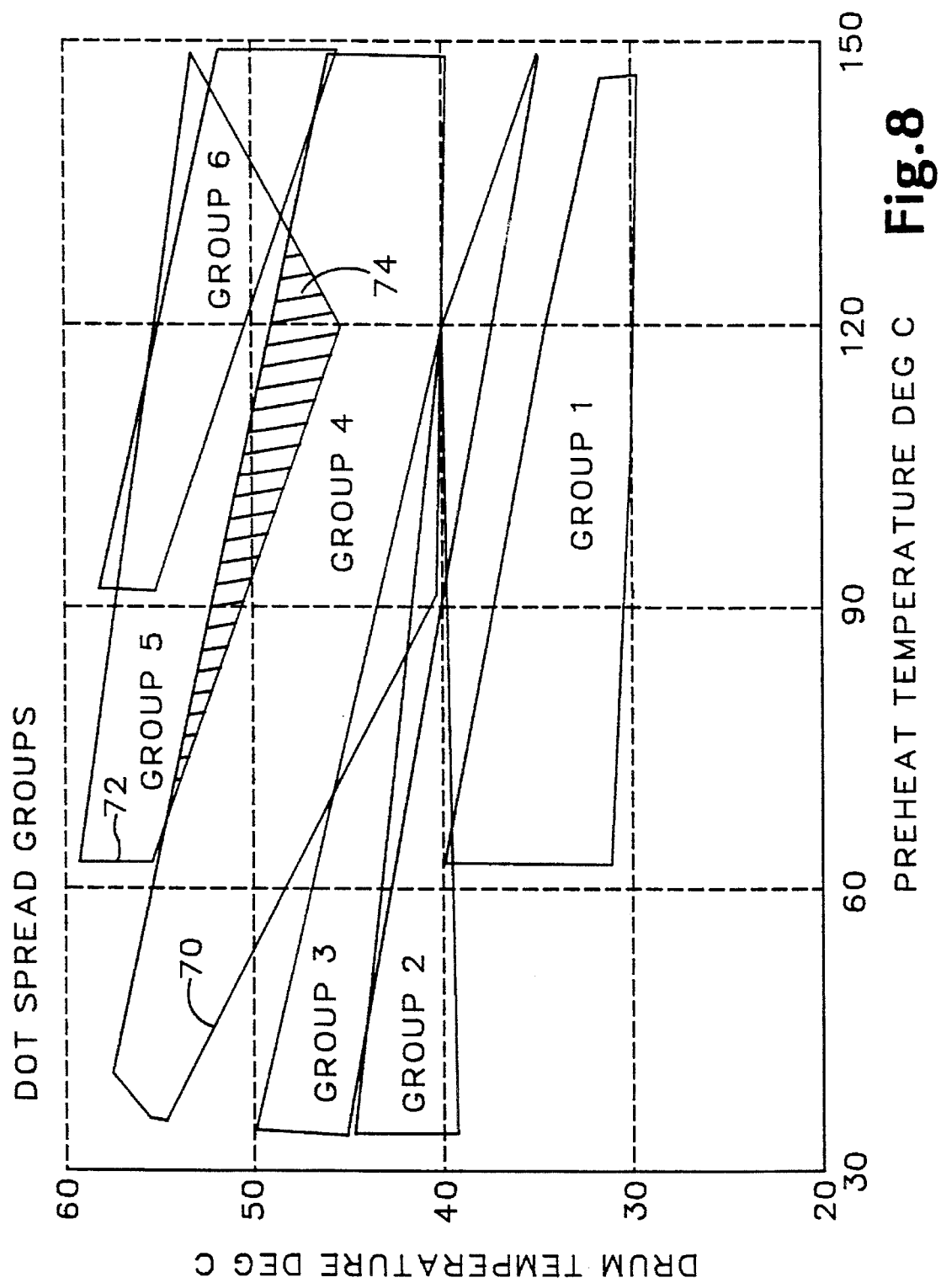
FIG. 8 is a graph showing dot spread groups as a function of media preheater and drum temperature as determined from a set of drop spread test prints made to determine a process window according to this invention.

Dot spread test print data are shown in FIG. 8, which plots dot spread group regions as a function of drum temperature and media preheater temperature. Dot spread groups 4 and 5 are bounded by respective outlines 70 and 72 (shown in bold), the outer extent of which delimit a temperature region within which the dot spreading is acceptable. The relatively horizontal orientation of the dot spread groups indicates that dot spreading is more dependent on the temperature of drum 14 than on the temperature of media preheater 27. A region 74 (shown cross-hatched) encompasses the optimized temperature transfer region shared by dot spread groups 4 and 5. The dot spread groups shown in FIG. 8 are outlines of the extreme data points from each group. Because dot spread groups are determined by a subjective measurement, some overlap exists among the groups and the extremes are only approximate.

The high temperature limit is defined as the maximum drum temperature at which ink image 26 can be transferred from drum 14 without some of the ink drops tearing apart because of cohesive failure, tearing apart from each other because of adhesive failure, or sticking to drum 14 because of a low yield stress as shown in FIG. 5. The high temperature limit is dominated by cohesive failure, which is quantified by first imaging drum 14 with 4×4 cm colored squares of cyan, magenta, yellow, black, green, blue and red ink. The colored squares are formed by depositing the appropriate number of single or overprinted layers of primary inks (cyan, magenta, yellow and black) onto intermediate transfer surface 12 of drum 14. The colored squares are then transferred to final receiving medium 21 as it passes through nip 22. A set of test prints are transferred with various temperature combinations of media preheater 27 and drum 14. Cohesive failure is usually observed on edges of the colored squares and is most easily observed as print remnants left on a chaser or cleaning sheet. Acceptable prints require substantially no cohesive failure.

Figure 9:
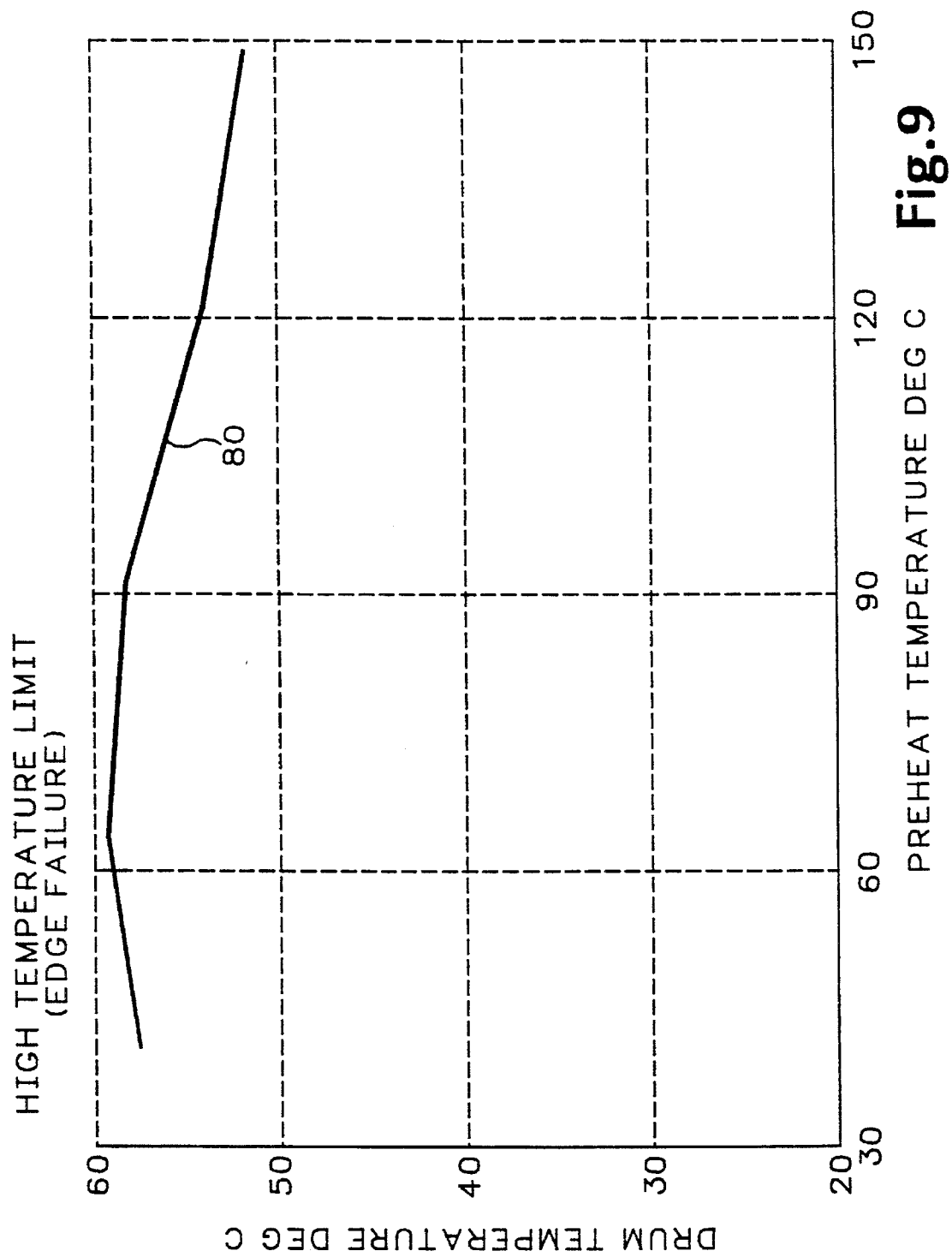
FIG. 9 is a graph showing high temperature limit as a function of media preheater and drum temperature as determined from a set of ink cohesive failure test prints made to determine a process window according to this invention.

High temperature limit test print data are shown in FIG. 9, which plots the cohesive failure as a function of drum temperature and media preheater temperature. A high temperature limit line 80 (shown in bold) delimits a top margin of a temperature region below which the ink will not undergo cohesive failure. The relatively horizontal orientation of line 80 shows that the high temperature limit is almost completely dependent on the temperature of drum 14.

However, the high temperature limit is an approximate value because cohesive failure is dependent on the test image, ink color, ink composition, and characteristics of intermediate transfer surface 12. In particular, using other than a solid fill test image has caused cohesive failure at lower temperatures than those resulting from the yellow squares image. At temperatures approaching the high temperature limit it is theorized that the intermediate transfer surface 12 becomes a factor in determining cohesive failure if there is an insufficient amount of the liquid forming the surface on drum 14. Drum surface roughness also affects cohesive failure.

Figure 10:
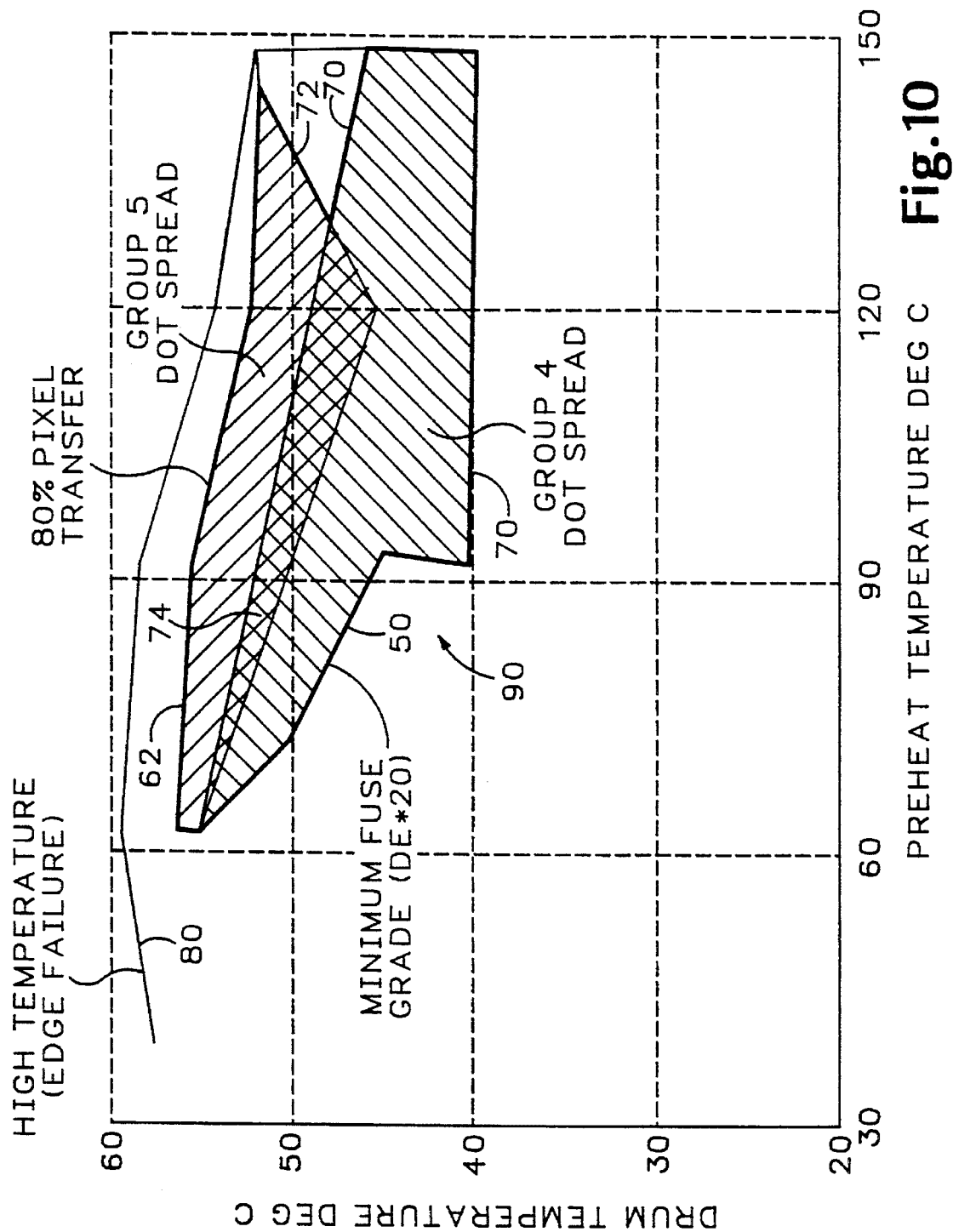
FIG. 10 is a graph showing a phase-change transfer printing process window bounded by the parameter limits shown FIGS. 6–9.

FIG. 10 shows a process window 90 that is defined by overlaying the data of FIGS. 6-9. Process window 90 has a left margin bounded by iso-fuse grade 20 (line 50 of FIG. 6), an upper margin bounded by 80 percent iso-pixel picking (line 62 of FIG. 7), a right margin bounded by dot spread groups 4 and 5 (outlines 70 and 72 of FIG. 8), and a lower margin bounded by dot spread group 4 (outline 70 of FIG. 8). The upper margin of process window 90 is a few degrees C below the high temperature limit (line 80 of FIG. 9).

Knowing process window 90 is useful for deriving the thermal specifications and tolerances required for obtaining acceptable prints from a phase-change transfer printer. In particular, media preheater 27, drum heater 28, power requirements, warm-up times, and cooling requirements can be determined. Process window 90 should have widely separated temperature boundaries to accommodate thermal mass variations and temperature nonuniformities associated with drum 14, media preheater 27, and roller 23.

Referring again to FIG. 1, for the above-described ink and imaging apparatus 10, a desirable media preheater 27 temperature range is from about 60° C. to about 150° C. and a desirable drum 14 temperature range is from about 40° C. to about 56° C. Operation in the window of optimized temperature transfer conditions is preferred and entails a media preheater 27 temperature range of from about 61° C. to about 130° C. and a drum 14 temperature range of from about 45° C. to about 55° C.

Maintaining drum 14 within the temperature limits defined by process window 90 requires heating drum 14 during periods of no printing and cooling drum 14 during periods of printing. Cooling is required during printing because heat is transferred by preheated media contacting drum 14 in nip 22, by printhead 11 depositing molten ink on drum 14, and by radiation from heated printhead 11.

Figure 11:
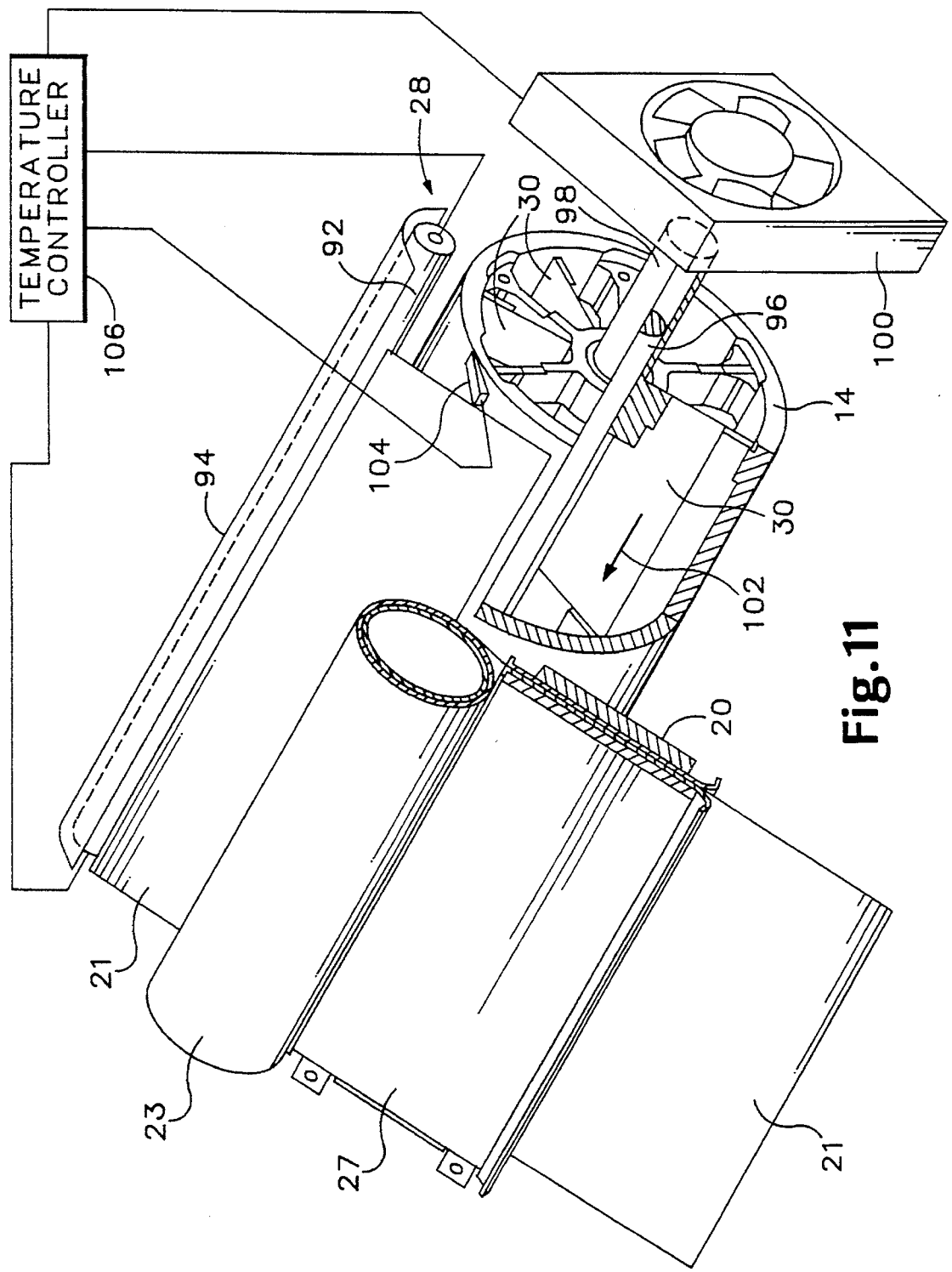
FIG. 11 is an isometric schematic pictorial diagram showing a media preheater, roller, print medium, drum, drum heater, fan, and temperature controller of this invention with the drum shown partly cut away to reveal cooling fins positioned therein.

Referring to FIG. 11, heat is added to drum 14 by drum heater 28 that preferably consists of a heater lamp 92 and reflector 94. Heater lamp 92 is of an infrared heating lamp type such as model No. QIR100-200TN1 manufactured by Ushio Corporation in Newberg, Oreg.

An alternate embodiment for drum heater 28 consists of a cylindrical cartridge or radiant lamp heater 96 axially mounted inside or adjacent to a hollow drum shaft 98. In this embodiment, heat from heater 96 is radiated directly and conducted to drum 14 by radial fins 30.

Drum 14 is cooled by moving air across radial fins 30 with a fan 100. Of course, fan 100 may blow or draw air in either direction through drum 14 to accomplish cooling. Preferably, fan 100 blows air through drum 14 in a direction indicated by an arrow 102. Fan 100 is preferably of a type such as model No. 3610ML-05W-B50 manufactured by N. M. B. Minibea, Co., Ltd. in Japan.

Media preheater 27 is set to a predetermined operating temperature by conventional thermostatic means. Drum temperature, however, is sensed by a thermistor 104 that slidably contacts drum 14 and is electrically connected to a conventional proportional temperature controller 106. When printing, heat is added to drum 14, which causes its temperature to exceed a predetermined temperature that is sensed by thermistor 104. In response, temperature controller decreases electrical drive power to drum heater 28 and turns on fan 100 to return drum 14 temperature to its set point. Conversely, when not printing, thermistor 104 senses a decrease in temperature below the set point. In response, temperature controller 106 turns off fan 100 and adds power to drum heater 28. Depending on the rate of cooling or heating required, temperature controller 106 may proportionally control one or both of drum heater 28 and fan 100. Small temperature changes primarily entail temperature controller 106 altering the amount of electrical power supplied to drum heater 28.

Skilled workers will recognize that portions of this invention may have alternative embodiments. For example, the drum heater 28 may be eliminated if a process window can be obtained that includes a drum temperature of about 30° C. Monochrome or color printing embodiments of the invention are possible. Other than a drum type supporting surface may be used, such as a flat platen or a belt. This invention may be embodied in various media marking applications, such as facsimile machines, copiers, and computer printers. The process window also may differ depending on various combinations of nip pressure, ink composition, intermediate transfer surface composition, drum surface finish and composition, and print medium composition. The intermediate transfer surface also may be applied to the drum in various ways, such as by an oil saturated web and metering blade assembly, a wick and reservoir with a dry cleaning web followed by a metering blade, buffing with an oil-soaked material, or use of an oil-soaked pad. Also, roller 23 could be heated to facilitate transfer and fusing of the image 26 to the final receiving substrate 21. Similarly, the printed medium preheater 27 could be eliminated to facilitate duplex printing applications or to employ different printing process windows.

It will be obvious to those having skill in the art that many changes may be made to the details of the above-described embodiments of this invention without departing from the underlying principles thereof. Accordingly, it will be appreciated that this invention is also applicable to ink temperature control applications other than those found in phase-change ink-jet transfer printers. The scope of this invention should, therefore, be determined only by the following claims.

We claim:

1. A method of transferring and fusing an image to a print medium in image, transfer printing from intermediate transfer surface to a final receiving substrate utilizing a process window defined by an interrelated set of parameters relating to transfer pressure, preheater temperature, intermediate transfer surface temperature, ink, and transfer speed, comprising:

providing a supporting surface;

controlling the supporting surface to maintain a predetermined surface temperature;

applying an intermediate transfer surface on the supporting surface;

depositing phase change ink in a phase-change ink image on the intermediate transfer surface, the image being maintained at a desired temperature of between about 20° C. and about 80° C.

heating a print medium with a media preheater set to a predetermined temperature of about 60° C. to about 150° C. to facilitate fusing the phase-change ink image to the print medium;

placing the heated print medium in contact with the phase-change ink image in a pressure nip and passing it through the pressure nip; and transferring the phase-change ink image to the print medium in the pressure nip by pressing the ink image into the ink image into the fibers of the final receiving substrate without cohesive failure.

2. The method of claim 1 in which the phase-change ink is of a type having a rubbery state when at a temperature of about 20° C. to about 60° C.

3. The method of claim 1 in which the determining step further comprises:

determining a maximum predetermined support surface temperature at or below which a predetermined percentage of the deposited ink image transfers to the print medium; and determining a minimum predetermined medium temperature at or above which the transferred ink image adequately adheres to the print medium.

4. The method of claim 1 in which the placing step further comprises pressing the heated print medium against the ink image with an amount of pressure that is about 1.5 to about 2:5 times a yield stress of the phase-change ink.

5. The method of claim 4 further comprising determining the supporting surface and medium temperature ranges within which ink drops comprising the deposited ink image are flattened and spread out by a predetermined amount during the transferring step.

6. The method of claim 4 further comprising:

determining a high temperature limit for the supporting surface temperature above which the ink image undergoes cohesive failure during the transferring step; and setting the range of the predetermined supporting surface temperatures in the process window below the high temperature limit.

7. The method of claim 1 which further comprises applying a liquid as the intermediate transfer surface.

8. An image transfer printing apparatus, comprising:

a rotating drum having a drum surface;

a temperature controller regulating the drum surface to a predetermined surface temperature;

an applicator applying an intermediate transfer surface to the drum surface;

an ink-jet printhead depositing a molten phase-change ink in a phase-change ink image on the intermediate transfer surface, the phase-change ink image cooling to about the predetermined surface temperature and changing to a rubbery solid state;

a media preheater set to a predetermined preheater temperature preheating a print medium to facilitate fusing the phase-change ink image, into the print medium; and a roller biased toward the drum to form a print medium receiving nip there between, whereby the preheated print medium is drawn by the rotating drum through the nip to transfer the phase-change ink image from the intermediate transfer surface to the print medium and press the ink image into the fibers of the print medium without cohesive failure at a nip pressure of about 1.5 to about 2.5 times a yield stress value of the phase-change ink.

9. The apparatus of claim 8 in which the phase-change ink exists in the rubbery solid state at a temperature of from about 20° C. to about 60° C.

10. The apparatus of claim 8 in which the predetermined surface temperature is in a range from about 40° C. to about 56° C.

11. The apparatus of claim 8 in which the predetermined surface temperature is in a range from about 45° C. to about 55° C.

12. The apparatus of claim 8 in which the predetermined preheater temperature is in a range from about 60° C. to about 150° C.

13. The apparatus of claim 8 in which the predetermined preheater temperature is in a range from about 60° C. to about 130° C.

14. The apparatus of claim 8 in which the temperature controller regulates the predetermined surface temperature in response to an electrical signal received from a thermistor that is in thermal contact with the drum.

15. The apparatus of claim 14 the temperature controller is of a proportional control type.

16. The apparatus of claim 14 in which the temperature controller regulates the predetermined surface temperature by a combination of heating the drum with a drum heater and cooling the drum with a fan.

17. The apparatus of claim 16 in which the fan moves air across fins mounted within the drum.

18. The apparatus of claim 8 in which the intermediate transfer surface is a liquid.

* * * * *

UNITED STATES PATENT AND TRADEMARK OFFICE
CERTIFICATE OF CORRECTION

PATENT NO. : 5,502,476
DATED : March 26, 1996
INVENTOR(S) : Meade M. Neal, Clark W. Crawford, Barry D. Reeves, James D. Rise It is certified that error appears in the above-indentified patent and that said Letters Patent is hereby corrected as shown below:

Claim 1, Column 13, line 39 delete "into the ink image", so that the final paragraph of Claim 1 reads "transferring the phase-change ink image to the print medium in the pressure nip by pressing the ink image into the fibers of the final receiving substrate without cohesive failure."

Signed and Sealed this

Seventh Day of January, 1997

Attest:

BRUCE LEHMAN

*Attesting Officer*          *Commissioner of Patents and Trademarks*